US008758956B2

(12) United States Patent
Delfino et al.

(10) Patent No.: US 8,758,956 B2
(45) Date of Patent: Jun. 24, 2014

(54) POLYMER MEMBRANE FUEL CELL

(75) Inventors: Antonio Delfino, Grolley (CH); David Olsommer, Le Mont Pelerin (CH)

(73) Assignee: Michelin Recherche et Technique S.A., Granges-Paccot (CH)

( * ) Notice: Subject to any disclaimer, the term of this patent is extended or adjusted under 35 U.S.C. 154(b) by 1691 days.

(21) Appl. No.: 11/887,245

(22) PCT Filed: Mar. 21, 2006

(86) PCT No.: PCT/EP2006/002560
§ 371 (c)(1), (2), (4) Date: Aug. 26, 2009

(87) PCT Pub. No.: WO2006/100029
PCT Pub. Date: Sep. 28, 2006

(65) Prior Publication Data

US 2010/0040930 A1 Feb. 18, 2010

(30) Foreign Application Priority Data

Mar. 25, 2005 (FR) ..................................... 05 03057

(51) Int. Cl.
*H01M 8/04* (2006.01)

(52) U.S. Cl.
USPC .......................................................... 429/514

(58) Field of Classification Search
USPC .......................................................... 429/514
See application file for complete search history.

(56) References Cited

U.S. PATENT DOCUMENTS 5,789,093 A * 8/1998 Malhi .......................... 429/455
6,022,634 A * 2/2000 Ramunni et al. .............. 429/463
2005/0037253 A1* 2/2005 Faghri ............................ 429/34
2008/0265403 A1* 10/2008 Cornie et al. ................ 257/706

FOREIGN PATENT DOCUMENTS

EP 0083192 A1 * 12/1982 ............. H01M 8/02
EP 0 083 192 7/1983
EP 1 061 598 12/2000
FR 2 836 285 8/2003
WO WO 99/27601 6/1999
WO WO 00/05775 2/2000

* cited by examiner

*Primary Examiner* — Karie O'Neill Apicella
(74) *Attorney, Agent, or Firm* — Cozen O'Connor

(57) ABSTRACT

A bipolar plate (1) comprising on the first face a groove forming a first distribution channel (111) for one of the gases, comprising on the second face a groove forming a second distribution channel for the other of the gases, comprising in its thickness an inner channel (122) for the circulation of a coolant, said plate being formed from a structural support having a surface that does not conduct electricity and that is chemically inert, said plate comprising pins (10) that pass through the whole thickness and that emerge on both sides through each of said first and second faces in the working section, said pins being spread over the entire working section of said plate.

10 Claims, 6 Drawing Sheets

POLYMER MEMBRANE FUEL CELL

RELATED APPLICATION

This is a U.S. National Phase Application under 35 USC 371 of International Application PCT/EP2006/002560, filed on Mar. 21, 2006.

This application claims the priority of French application no. 05/03057 filed Mar. 25, 2005, the content of which is hereby incorporated by reference.

FIELD OF THE INVENTION

The present invention relates to polymer membrane fuel cells. More particularly, it relates to the bipolar plates installed between each of the individual electrochemical cell units and the end plates installed on both sides of the stack of the various electrochemical cell units.

PRIOR ART

The bipolar plates used in fuel cells fulfil two very different functions. It is known that it is necessary to supply the cell with fuel gas and with oxidizer gas, that is to say with hydrogen and air or pure oxygen, and that it is also necessary to cool the cell, that is to say to make a coolant such as water pass through it. One of the functions of the bipolar plates is to allow the transport of these various fluids required for the operation of the fuel cell. Furthermore, the bipolar plates also fulfil an electrical function: namely ensuring electrical conduction between the anode and the cathode of each of the adjacent electrochemical cell units. Indeed, a fuel cell is always formed by assembling a large number of individual electrochemical cell units in series, the nominal voltage of the cell being obtained by electrically connecting the required number of individual electrochemical cell units in series.

These various functions, namely transporting the fluids and conducting electricity, determine the specifications which the materials used for producing these bipolar plates must meet. The materials used must have a very high electrical conductivity. The materials used must also be impermeable to the fluids used and demonstrate very high chemical stability towards these fluids.

Moreover, the bipolar plates must have sufficient mechanical properties to enable the superposition of a large number of individual electrochemical cell units and associated bipolar plates and to allow the assembly to be held by compression between end plates using tie rods. The bipolar plates must have sufficient mechanical properties to withstand this compression. Graphite is commonly used as this material simultaneously offers a high electrical conductivity and is chemically inert to the fluids used. Patent Application WO 2005/006472 discloses the possible embodiment of such bipolar plates. It can be seen that they are formed by the superposition of two relatively rigid graphite plates with interposition of a sheet made from relatively flexible graphite material in order to accommodate the thickness tolerances of the various layers. The graphite plates comprise the networks of channels required for distributing the fuel gas and the oxidizer gas, that is to say hydrogen and air or pure oxygen, and the network of channels that allow each bipolar plate to be passed by a coolant such as water.

Unfortunately, the rigid elements involved in forming graphite bipolar plates are relatively brittle during impacts, in particular during handling while assembling the cell. The layer produced from flexible graphite material, which has been mentioned previously, is in addition most particularly difficult to handle in an industrial process. All this significantly increases the production costs of such bipolar plates.

U.S. Pat. No. 6,379,476 proposes producing bipolar plates made of stainless steel coated with a surface-passivated film and having carbide inclusions that protrude at the surface. According to the filer of that patent, the proposed product should have an electrical contact resistance low enough to make bipolar plates therefrom. However, although this solution may have some advantages relative to the bipolar plates produced completely from graphite, especially as regards the mechanical properties, it remains complex to implement and the electrical resistivity may prove too high, especially if it is intended to achieve a very high power density for the fuel cell.

Patent Application WO 00/05775 proposes producing bipolar plates made from a polymer material having good mechanical strength up to high temperatures, that has good physicochemical behaviour in an oxidizing atmosphere in the presence of water vapour or condensates which may comprise acid traces, the electrical conduction through the bipolar plate being provided by metal cylinders passing through the polymer plates and projecting into each of the faces in order to penetrate into the electrodes located on both sides of each polymer plate. This disclosure does not address the problem of cooling the bipolar plate.

Patent Application FR 2 836 385 describes a bipolar plate formed by two distribution plates for fuel and oxidizer gases produced from a non-metallic material, kept spaced apart from one another in order to lay between them channels for circulation of a heat transfer fluid. Collection of the current produced by each electrochemical cell unit is ensured by two elements placed on each side of each bipolar plate, above the non-metallic gas distribution plates. Each element has enough holes for the gas to pass through it. The elements are electrically connected to each bipolar plate. In view of the description of that patent application, it becomes apparent that the electrical connection is of a specialist type, one that is complex to produce. In one of the embodiments, the electrical connection is provided by copper interlayers keeping the non-metallic gas distribution plates apart. As a variant, it is proposed to provide these electrical connections on the outside of the plates. In any case, this requires complex parts, welds, and makes the structure heavy, bulky and very expensive to produce.

SUMMARY OF THE INVENTION

One object of the present invention is to provide an arrangement for a bipolar plate or for an end plate which is as easy to manufacture as possible, which makes it possible to achieve very high power output levels relative to the weight and size of the fuel cell, that is to say which especially enables cooling with a heat transfer liquid, in order to make the use of the fuel cell in a motor vehicle considerably easier.

One aspect of the invention is directed to a distribution plate having a first face intended to be brought into contact with a membrane for diffusing one of the gases used by a fuel cell, having a second face opposite said first face, said distribution plate having a given thickness and having a working section intended to be installed opposite an ion exchange membrane. On the first face, a groove forms a first distribution channel for one of the gases, said first distribution channel being approximately spread over the entire working section of said first face. The distribution plate is formed from a structural support that does not conduct electricity, at least on the surface, and that is chemically inert, at least on the surface, in that said distribution plate comprises pins that penetrate into the structural support, the projection of said pins through said first face not intersecting said first channel, said pins being produced from a non-metallic material that conducts electricity.

Of course, although only a single gas distribution channel is mentioned above, which, in particular, evokes the distribution plates used at the ends of a fuel cell, an embodiment of the invention also relates to the bipolar plates inserted between two electrochemical cell units that are adjacent and are electrically coupled in series by said bipolar plates. In this case, the embodiment extends to a distribution plate forming a bipolar plate, the second face this time being intended to be brought into contact with a membrane for diffusing the other of the gases used by a fuel cell, the second face comprising a groove forming a second distribution channel for the other of the gases, said second distribution channel being approximately spread over the entire working section on the second face.

Advantageously, to ensure cooling of the distribution plate, the distribution plate according to the invention, in particular when it forms a bipolar plate, comprises in its thickness an inner channel having a layout covering approximately the entire working section and not emerging either on the first face or on the second face in said working section, for the circulation of a coolant.

The invention thus proposes to separate the functions of transporting fluids on the one hand and of electrical conduction on the other hand, in the distribution plates, in particular the bipolar plates. For the structural support, the invention makes the choice of a material that is chemically inert or that is rendered chemically inert to the fluids used, at least on the surface, more specifically at least for the surface in contact with said fluids. Indeed, it is very important that the surface of the material is not attacked by hydrogen, by oxygen, by the water that reforms or by any other substance transported in the channels, and in particular that the material remains inert, on the surface, to the harsh conditions in an operating fuel cell. Moreover, and still regarding the structural support, here again at least on the surface, this is chosen to be electrically non-conductive or very poorly conductive. This is in particular advantageous for all the surfaces in contact with the coolant in a cooled bipolar plate. This exempts the coolant from being electrically non-conductive.

The mechanical properties of the material chosen for the structural support are adapted to the mechanical stresses due to the manufacturing process and also those occurring in operation. In order that it be electrically non-conductive, at least on the surface, it is possible to adopt a material that is electrically non-conductive throughout its entire volume, such as a plastic. However, in order to optimize the thermal conduction, in particular for producing a bipolar plate, a metallic material is preferably chosen, this metallic material being suitably treated to meet the requirement of having a non-conductive and sufficiently chemically inert surface.

The electrical conductivity required for the electrical operation of a distribution plate, in particular in its bipolar form, is provided by a sufficient number of pins made of a conductive material that pass through the entire thickness of the plate and are preferably spread over its entire surface. Thus, the pins are produced from a material from the group comprising graphite, a polymer highly filled with carbon black and a polymer filled with short carbon black fibres. The group may also contain a polymer filled with a metal powder on condition that there is not any metal powder on the surface, which, for example, requires a manufacturing process having two successive injection-moulding operations.

For example, a bipolar plate made from two superposed distribution plates is produced, this not being limiting. One of these distribution plates comprises a channel for transporting one of the gases and the other of these distribution plates comprises a channel for transporting the other of the gases on one of its faces and a channel intended for the coolant to pass through on the other of its faces. The distribution plates are superposed by placing the channel for the coolant in the centre, hence the name "inner channel".

The structural support for the plate may be a plastic, or may be made of aluminium rendered inert to the chemical attack of the fluids used. Indeed, it is known how to passivate an aluminium plate and it is well known that such a passivation coating makes the aluminium non-conductive because it forms an aluminium oxide.

Each of the distribution plates is pierced, before assembly, or else the bipolar plate thus produced can then be pierced, after assembly, with a multitude of very small diameter holes in the areas where the channels do not pass. Pins made of a conductive material can then be inserted into these holes. It is therefore necessary to arrange it so that the layout of the first and second channels and of the inner channel leave, in the working section, areas that allow such holes to be produced so that these holes are themselves also spread over the entire working section and form a sufficient cumulative section considering the maximum current intensity that the fuel cell will deliver. Note that the cross section of the holes may be any other than circular, for example square, or oval, that the cross sections of various holes may be of different shapes or have different diameters or dimensions.

The material used for the pins may be graphite, even without particular mechanical qualities. Note that it is however useful for it to have a good chemical insensitivity towards the fluids as its ends will be in contact with the gases used and with the water reformed by contact on the diffusion membranes of each electrochemical cell unit, which cannot be obtained without particular treatment with the metallic materials.

The following description describes a bipolar plate in detail. Of course, as already said, the invention is not limited to the bipolar plates; it also extends to the distribution plates positioned on both sides of the stack of individual cell units. At the ends, the distribution plate is very similar to the first distribution plate described below since, at each of the ends, it is only necessary to diffuse one of the two gases used by the fuel cell and it is generally pointless to provide an inner cooling channel.

BRIEF DESCRIPTION OF THE DRAWINGS

The present invention will be better understood thanks to the detailed description of one embodiment illustrated with the appended figures in which.

DETAILED DESCRIPTION OF THE DRAWINGS

Figure 1:
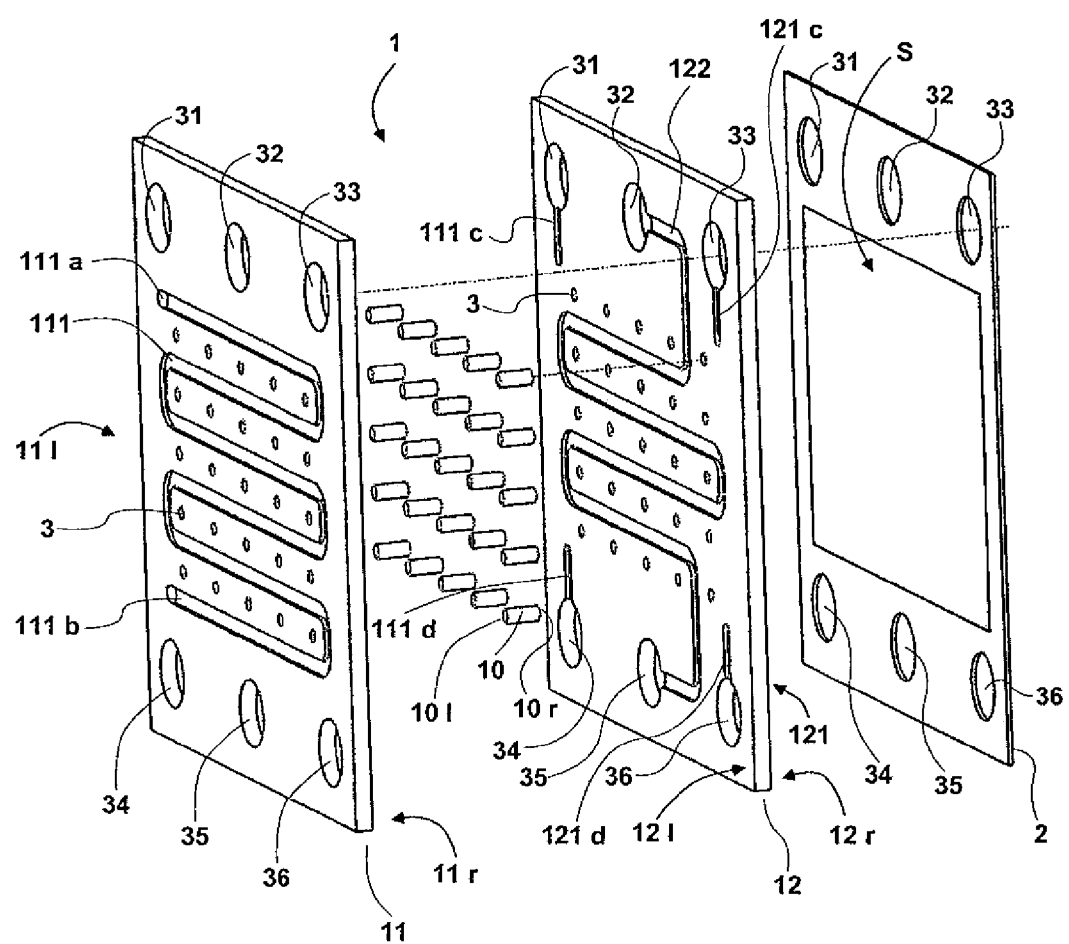
FIG. 1 is an exploded view showing the various constituent elements of a bipolar plate according to the invention.

Seen in FIG. 1 is a bipolar plate 1 formed by assembling a first distribution plate 11 and a second distribution plate 12. The bipolar plate 1 is intended to be combined with elements forming an electrochemical cell unit 2. It is known that an individual electrochemical cell unit 2 is at the current time (without this in any way limiting the invention) usually formed by superposing five layers: an ion exchange polymer membrane, two electrodes comprising the chemical elements required for starting the electrochemical reaction, such as for example platinum, and two gas diffusion layers that make it possible to provide a homogeneous diffusion of the gases transported by the networks of bipolar plates over the whole of the ion exchange membrane surface. Located on the electrochemical cell unit 2 in FIG. 1 is a surface corresponding to the working section S of the fuel cell, that is to say the area that is the site of the electrochemical reaction enabling electricity to be produced.

The first distribution plate 11, the second distribution plate 12 and the electrochemical cell unit 2 comprise on one side an area having three openings 31, 32 and 33 of relatively large cross section, and also on the opposite side another area also having three openings 34, 35 and 36 of relatively large cross section. All the openings 31 are lined up from one distribution plate 11 to the other 12 and from the distribution plates 11 and 12 to the electrochemical cell unit 2. Similarly, all the openings 32, 33, 34, and 36 respectively are lined up from one distribution plate 11 to the other 12 and from the distribution plates 11 and 12 to the electrochemical cell unit 2. The set of openings 31 and 33 respectively form a manifold for transporting one of the gases: of the openings 31 and 33, some (for example 31) transport hydrogen and the others (for example 33) transport oxygen. The set of openings 34 and 36 respectively form a manifold for the return of one of the gases: of the openings 34 and 36, some (34) ensure the return of hydrogen that has not been consumed by the fuel cell and the others (36) ensure the return of oxygen that has not been consumed by the fuel cell. All the openings 32 form a manifold that transports the coolant whilst all the openings 35 form a manifold which ensures the return of the coolant being used to control the temperature of the fuel cell.

One of the faces 11*l* of the first distribution plate 11 comprises a first distribution channel 111 laid out in order to distribute one of the two gases used by the fuel cell over the whole of the working section S of the first plate 11. The first distribution channel 111 begins with an orifice 111*a* passing through the thickness of the first distribution plate 11, and terminates with an orifice 111*b* which also passes through the first distribution plate 11.

One of the faces 12*l* of the second distribution plate 12 comprises an inner channel 122, laid out in order to distribute the coolant used to control the temperature of the fuel cell over the whole of the working section S of the second distribution plate 12. The orifice 111*a* is lined up with the end of a channel section 111*c* cut into the face 121 in order to communicate with said channel 111*c*. The orifice 111*b* is lined up with the end of a channel section 111*d* cut into the same face 12*l*, in order to communicate with said channel 111*d*. Each of these channel sections 111*c* and 111*d* communicates with the openings 31 and 34. This provides communication between the first distribution channel 111 and the manifolds in question.

On the other 12*r* of these faces, not visible in FIG. 1, the second plate 12 has a second distribution channel 121 (not visible, similar to the distribution channel 111 and it too laid out so as to distribute the other of the two gases used by the fuel cell over the whole of the working section of the second distribution plate 12). The openings 33 and 36 of the second distribution plate 12 are in communication with, respectively, a channel section 121*c* and with a channel section 121*d* both cut into the face 12*l*. Each of the channel sections 121*c* and 121*d* terminates in an orifice (not visible in FIG. 1) that passes through the thickness of the second distribution plate 12, in order to bring the second channel 121 into contact with the manifolds in question.

It may be seen that the first distribution plate 11 and the second distribution plate 12 comprise a large number of holes 3. The holes 3 produced on the first distribution plate 11 and the holes 3 produced on the second distribution plate 12 are lined up. It may be observed that the holes 3 are produced so as to never intersect any of the channels 111, 121 and 122 laid out on each of the first 11 and second 12 distribution plates.

In FIG. 1, the pins 10 intended to be introduced into each of the holes 3 can also be seen. These pins are formed by small cylinders produced, for example, from graphite. It is possible to produce a large number of holes, for example a hundred, on the surface of a distribution plate without ever crossing the gas distribution channels or the inner channel provided for the circulation of the coolant. The cross section of each of these holes is for example around 1 $mm^2$. Thus, it can be seen that the cumulative cross section of all of the pins will make it possible to pass high operating currents such as those developed in a fuel cell.

Figure 2:
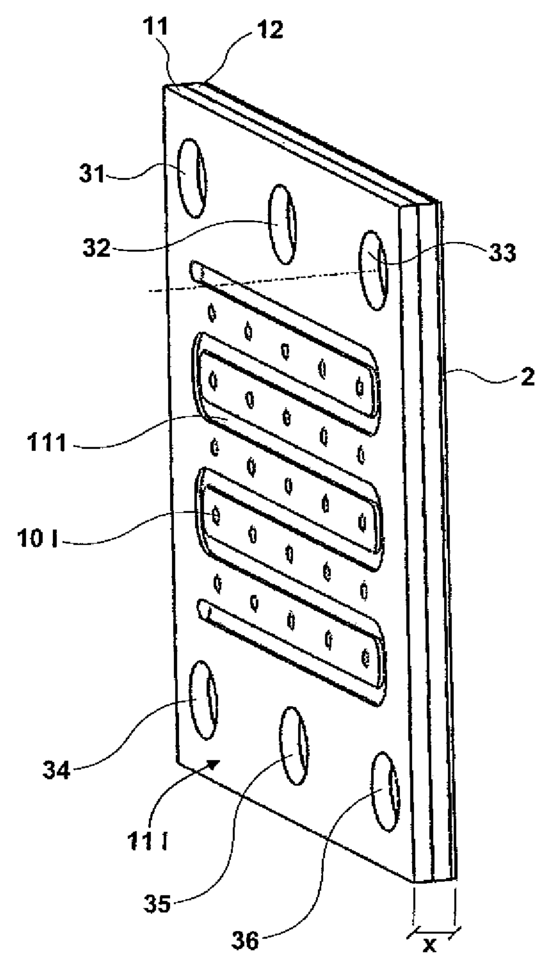
FIG. 2 shows a bipolar plate according to the invention as it appears when it is assembled.

FIG. 2 shows a bipolar plate 1 according to the invention after assembling the various elements (distribution plates 11 and 12 and pins 10) presented with the help of FIG. 1. This assembly may be carried out, for example, by bonding the distribution plates to one another, then by press fitting the pins 10, in order to ensure good sealing between the distribution channels between themselves and with respect to the inner channel, and between the faces 11*l* and 11*r* in order not to mix the gases. The pins 10 emerge on both sides on each of said first and second faces in the working section.

Each of the faces 11*l* and 11*r* of such a bipolar plate may cooperate with one of the diffusion layers of the adjacent electrochemical cell units 2. FIG. 2 shows a bipolar plate 1, of thickness x, combined with an individual electrochemical cell unit 2. A large number of electrochemical cell units 2 are superposed with interposition of bipolar plates 1, and simple (non-bipolar) distribution plates are placed at the ends in order to form a fuel cell.

Thus, thanks to the invention, it is possible to choose, as a base constituent material of each of the individual plates, a material having mechanical properties sufficient to allow not only the transmission of operating stresses for the fuel cell, but also to allow the manufacture of bipolar plates to be automated. Indeed, such automation assumes handling by process robots and when this handling requires few precautions owing to the solidity of the constituent material of the base plates, carrying out automated production will only be simpler, more robust and more economical. For this first embodiment, each of the individual plates is produced from a single block forming a structural support. The structural support may be produced either from plastic or, preferably, to promote heat exchange, from aluminium, anodized and covered with polytetrafluoroethylene (PTFE) on the surface in order to fulfil the requirement of a non-conductive surface and to improve its chemical inertness.

The electrical conduction from one electrochemical cell unit 2 to the other is provided solely by the pins 10, of which one of the ends 101 is seen showing on the face 11*l* of the bipolar plate 1 in FIG. 2. The concentration of the electrical function over a reduced surface relative to the working section S makes it possible all the same to transmit operating currents without reaching a too high current density. Thus, the concentration of the conductive part on a small part of the surface of the plates used, typically less than 10% of the whole of the working section, makes it possible to arrange the layout of the distribution channels and inner channel without particular difficulty.

Figure 3:
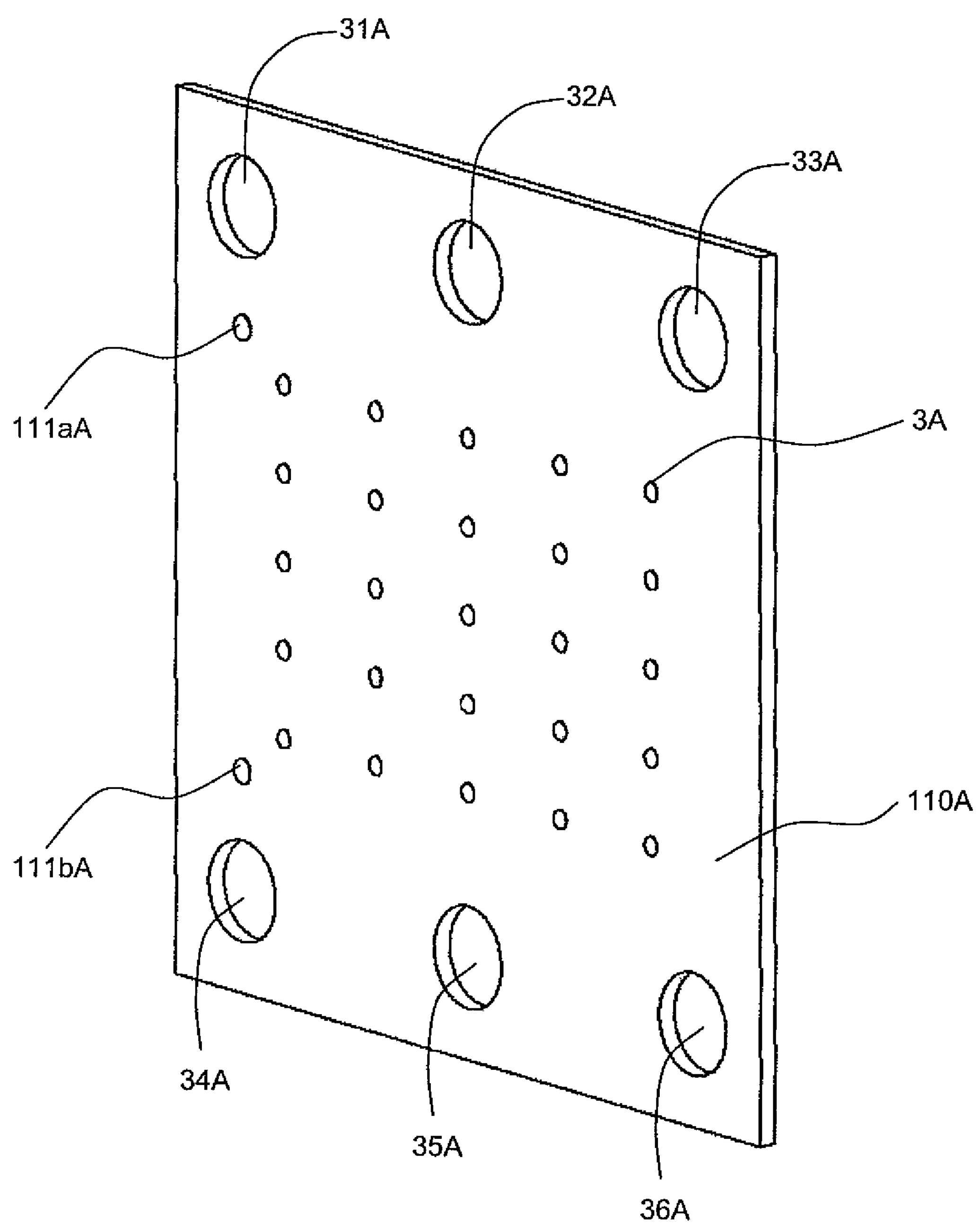
FIG. 3 shows a structural support from one embodiment.

One variant of the invention, illustrated by FIG. 3 onwards, will now be examined. In this variant, the pins 10A (see FIG. 4) are produced from an injection-mouldable material and the distribution plate comprises, on the side of the first face, a surface layer produced from the same material as the pins. The surface layer is overmoulded on the structural support by the same injection-moulding operation that enables the pins to be produced, so that the surface layer and the pins form a continuous medium promoting electrical conduction.

In order to injection mould the pins (and therefore the surface layer in the example described here), it is possible to use a paste having, as the main components, carbon black and a thermosetting or thermoplastic fluoropolymer, for example polyvinylidene fluoride PVDF. The amounts of carbon and polymer are at least 70% by weight of carbon black and preferably 80%, the remainder being the polymer. The amount of carbon must be sufficient for the surface electrical resistance of the pin to as low as possible. The polymer itself must provide the necessary binder, be corrosion resistant and be able to be easily extruded and injection-moulded.

In FIG. 3, a structural support 110A intended to form part of a first distribution plate 11A (see FIG. 6) can be seen. This structural support is formed from a sheet of anodized aluminium. The structural support 110A comprises on one side an area having three openings 31A, 32A and 33A of relatively large cross section and also on the opposite side another area also having three openings 34A, 35A and 36A of relatively large cross section. As in the first example, the set of openings 31A, 32A, 33A, 34A, 35A and 36A forms manifolds for transporting and discharging the gases. The structural support 110A comprises an orifice 111*a*A passing through the thickness of the first distribution plate 11A and comprises an orifice 111*b*A which also passes through the first distribution plate 11A. These orifices 111*a*A and 111*b*A are the beginning and end of a distribution channel as will be better understood later on.

The structural support 110A also comprises a multitude of holes 3A. The openings, orifices and holes described above are, for example, produced by punching. After punching, the aluminium sheet is anodized in order to have an excellent chemical insensitivity and at the same time to become non-conductive at the surface, including over all the edges of the sheet (openings 31A, 32A, 33A, 34A, 35A and 36A, orifices 111*a*A and 111*b*A, and holes 3A), therefore including at the surface that forms part of the manifolds for the gases and the coolant and the latter characteristic is particularly advantageous because it opens the possibility of using a coolant that conducts electricity. Of course, the non-conductive character at the surface does not have particular advantage for the holes 3A but does not harm them in any way.

Figure 4:
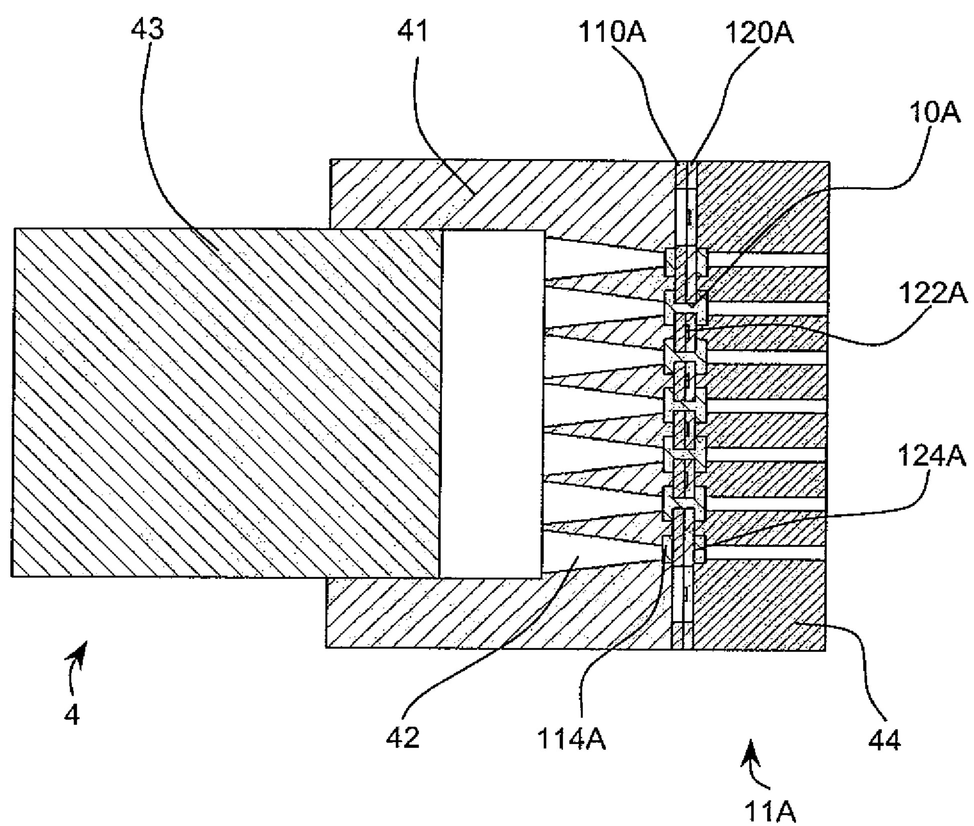
FIG. 4 shows a device for injection-moulding the pins of said embodiment.

In FIG. 4, an injection-moulding tool 4 comprising a head 41 equipped with a certain number of injection-moulding cones 42 can be seen. An injection ram 43 and also a counter-mould 44 can also be seen. Mounted between the injection head 41 and the counter-mould 44 are a structural support 110A and a structural support 120A. These structural supports 110A and 120A each form part of a distribution plate, namely the first distribution plate 11A and a second distribution plate 12A respectively. As has been explained for the first exemplary embodiment, the second distribution plate 12A comprises an inner channel 122A, laid out to distribute the coolant used to control the temperature of the fuel cell over the whole of the working section S of the second distribution plate 12A. All the details of embodiments common to the two variants set out in this document will not be repeated.

Figure 5:
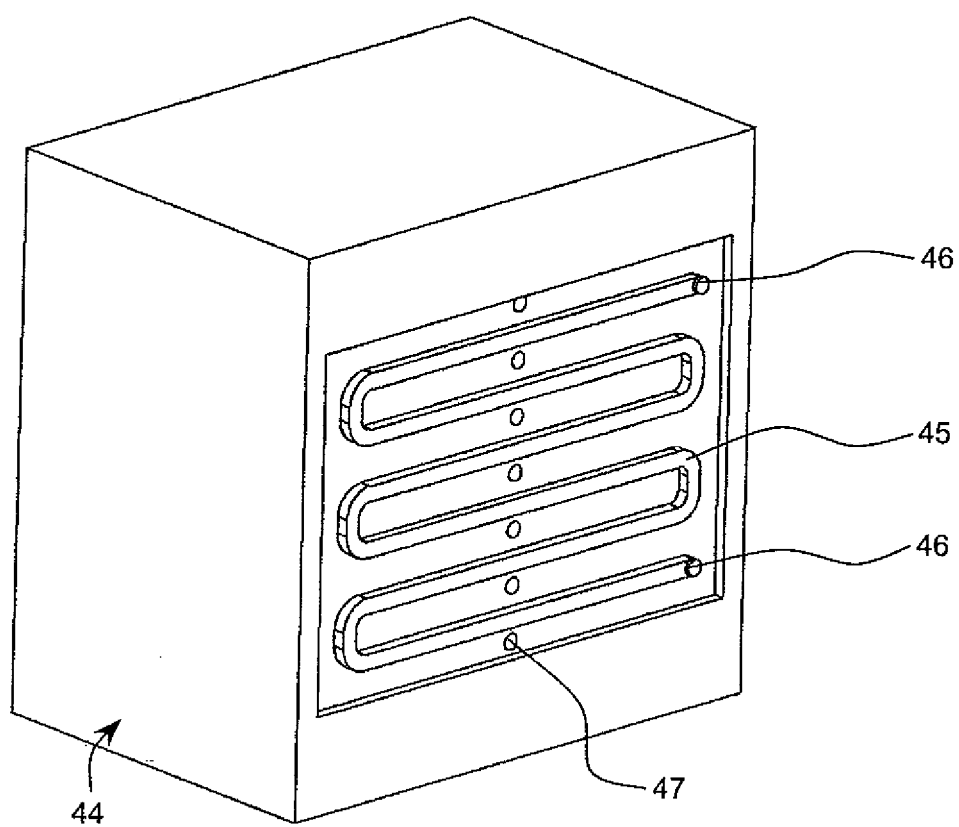
FIG. 5 shows a counter-mould used in the injection-moulding device from FIG. 4.

The counter-mould 44, seen in perspective in FIG. 5, comprises a rib 45 forming the negative of a distribution channel 111A to be formed on the distribution plate 11A. In particular, protuberances 46 intended to be engaged in the orifices 111*a*A and 111*b*A of the structural support 110A can be seen. Orifices 47, judiciously placed to discharge the excess material during each injection, can also be seen.

Figure 6:
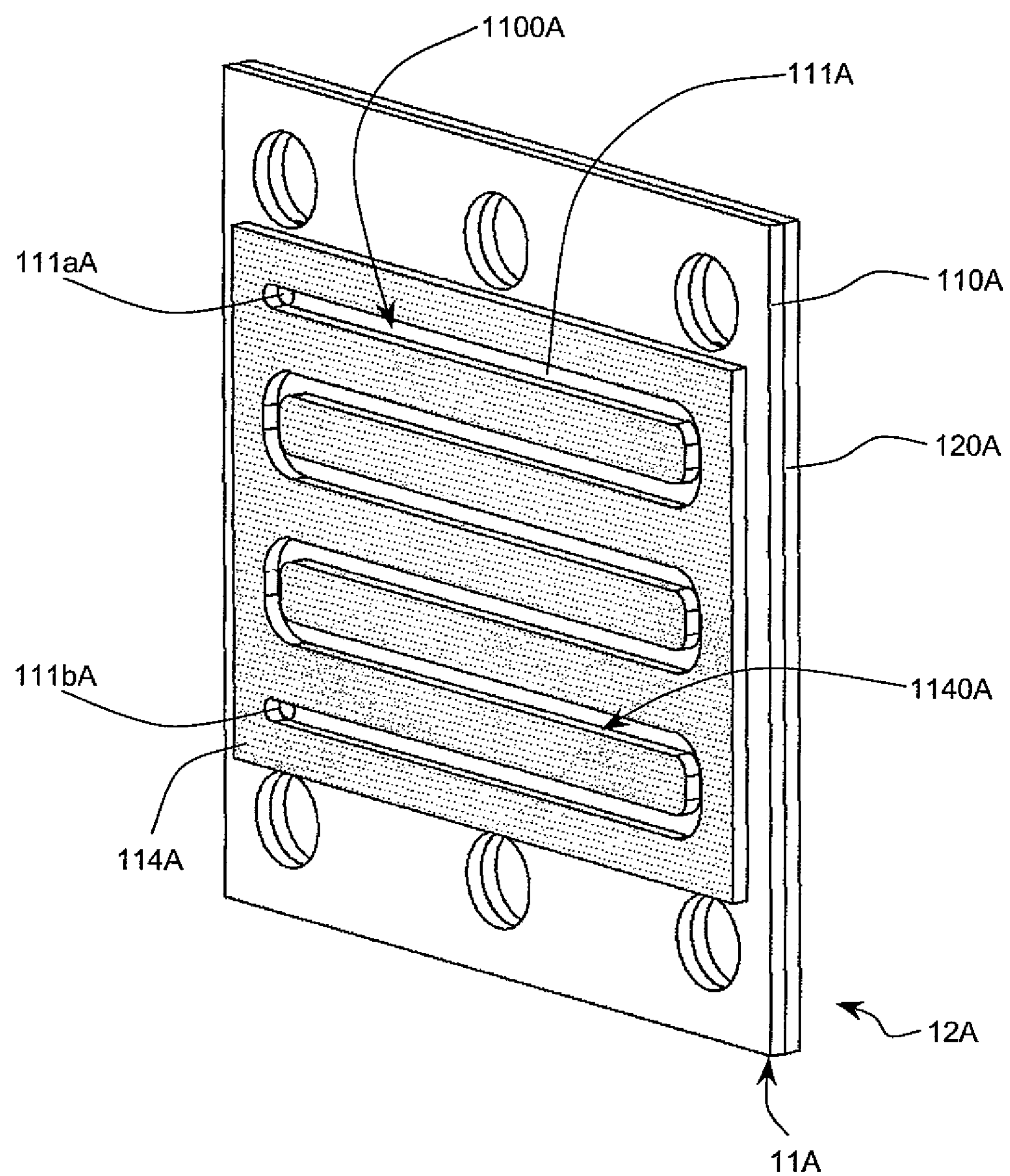
FIG. 6 shows a bipolar plate according to said embodiment.

FIG. 6 illustrates the state of the distribution plate 11A as it results from the injection-moulding process explained above. The structural support 110A and the overmoulded surface layer 114A can be recognized. In FIG. 4, the surface layer 114A overmoulded on the structural support 110A and the surface layer 124A overmoulded on the structural support 120A can be seen. The orifices 111*a*A and 111*b*A and the distribution channel 111A formed by the surface 1100A of said structural support can be seen, the sides 1140A of said distribution channel being formed by said surface layer. It is then advisable to carry out an over-moulding of an electrically non-conductive and chemically inert material above the periphery of the structural support all over the surface layer, so that the distribution plate assembly has a homogeneous thickness.

Finally, a very interesting advantage of the two variants of the present invention described above will be pointed out. Due to the fact that the electrically conductive part of the bipolar plates does not cross any of the channels, in particular does not cross the inner channel in which the coolant flows, there is no longer earthing by the fluid system or systems. There is therefore no longer a need to insulate them from the bulk or to use a non-conductive fluid as a coolant. A conventional water/glycol mixture, such as that used to cool internal combustion engines, is perfectly suitable.

The invention claimed is:

1. A distribution plate having a first face adapted to be brought into contact with a membrane for diffusing one of the gases used by a fuel cell, having a second face opposite said first face, said distribution plate having a given thickness and having a working section intended to be installed opposite an ion exchange membrane, comprising on the first face a groove forming a first distribution channel for one of the gases, said first distribution channel being approximately spread over the entire working section of said first face, wherein said distribution plate is formed from a structural support that does not conduct electricity, at least on the surface, and that is chemically inert, at least on the surface, in that said distribution plate comprises pins that penetrate into the structural support, the projection of said pins through said first face not intersecting said first channel, said pins being produced from a non-metallic material that conducts electricity, wherein the thickness of the distribution plate comprises an inner channel having a layout covering approximately the entire working section and not emerging either on the first face or on the second face in said working section, said inner channel being provided for the circulation of a coolant, and wherein the coolant is always in a liquid phase.

2. The distribution plate according to claim 1, in which the pins are produced from a material comprising one of graphite, a polymer highly filled with carbon black, and a polymer filled with short carbon black fibres.

3. The distribution plate according to claim 1, wherein the structural support is produced from a material that does not conduct electricity.

4. The distribution plate according to claim 3, wherein the structural support material is a plastic.

5. The distribution plate according to claim 1, wherein the structural support material is surface-passivated aluminium.

6. The distribution plate according to claim 1, in which the pins are produced from an injection-mouldable material.

7. The distribution plate according to claim 6, in which the pins are produced from an injection-mouldable material, comprising on the side of the first face a surface layer produced from the same material as the pins, the bottom of said first distribution channel being formed by the surface of said structural support, the sides of said first distribution channel being formed by said surface layer.

8. The distribution plate according to claim 1, in which said pins emerge on both sides through each of said first and second faces in the working section.

9. The distribution plate according to claim 1, comprising a bipolar plate, the second face being adapted to be brought into contact with a membrane for diffusing the other of the gases used by a fuel cell, comprising on the second face a groove forming a second distribution channel for the other of the gases, said second distribution channel being approximately spread over the entire working section on the second face.

10. The distribution plate according to claim 1, in which said pins are spread over the entire working section.

* * * * *